(12) United States Patent
Ono (10) Patent No.: US 8,587,704 B2
(45) Date of Patent: Nov. 19, 2013

(54) IMAGING DEVICE (75) Inventor: Shuji Ono, Saitama (JP)

(73) Assignee: Fujifilm Corporation, Tokyo (JP)

( * ) Notice: Subject to any disclaimer, the term of this patent is extended or adjusted under 35 U.S.C. 154(b) by 551 days.

(21) Appl. No.: 12/968,793

(22) Filed: Dec. 15, 2010

(65) Prior Publication Data
US 2011/0149121 A1 Jun. 23, 2011

(30) Foreign Application Priority Data

Dec. 18, 2009 (JP) .................................. 2009-287530

(51) Int. Cl.
*H04N 9/097* (2006.01)
*H04N 9/083* (2006.01)
*H04N 5/225* (2006.01)

(52) U.S. Cl.
USPC ........... 348/259; 348/290; 348/342; 348/343; 348/344

(58) Field of Classification Search
USPC ................................... 348/259, 290, 342–344
See application file for complete search history.

(56) References Cited

U.S. PATENT DOCUMENTS

2006/0256226 A1* 11/2006 Alon et al. .................... 348/335

FOREIGN PATENT DOCUMENTS

JP 2009-089082 4/2009

OTHER PUBLICATIONS

E.R. Dowski Jr and W.T. Cathey, "Extended depth of field through wave-front coding", Appl. Opt., vol. 34, No. 11, pp. 1859-1866, 1995.

* cited by examiner

*Primary Examiner* — Joel Fosselman
(74) *Attorney, Agent, or Firm* — Young & Thompson (57) ABSTRACT

An imaging device includes: an optical system, for focusing light from subjects; color imaging element including a plurality of types of light receiving sections that detect light of different wavelength bands, for imaging focused images of the subjects; and an image processing section, for performing filtering processes to remove blur caused by the optical system from data output by the imaging element. The pitch among specified light receiving sections that contribute most to brightness signals is set smaller than that among other light receiving sections. The point spread diameter of the optical system on the specified light receiving sections is set to be greater than the pitch among the specified light receiving sections for wavelengths detected thereby, and less than the pitches among the other light receiving sections for wavelengths detected thereby. The image processing section performs the filtering process only on data output by the specified light receiving sections.

4 Claims, 5 Drawing Sheets

IMAGING DEVICE

BACKGROUND OF THE INVENTION

1. Field of the Invention

The present invention is related to an imaging device. More particularly, the present invention is related to an imaging device that enables obtainment of color images in a focused state regardless of the distance to a subject.

2. Description of the Related Art

An imaging device has been proposed, in which the point spread properties of an imaging lens optical system are intentionally expanded to a size that includes a plurality of pixels of imaging elements, while image reconstruction processes, that is, processes in which image signals are passed through reconstructing filters having properties inverse the blur properties of the imaging lens optical systems, are administered to enable obtainment of images in a focused state regardless of the distances to subjects. Japanese Unexamined Patent Publication No. 2009-089082 and E. R. Dowski, Jr. and W. T. Cathey, "Extended depth of field through wave-front coding", Appl. Opt., Vol. 34, No. 11, pp. 1859-1866, 1995 describe examples of such an imaging device.

It is often the case that the aforementioned type of imaging device employs an imaging element constituted by a CCD or the like, similar to general imaging devices. In this case, a color imaging element, in which a color filter constituted by R (red), G (green), and B (blue) filters for each pixel arranged in a two dimensional matrix is provided on a photoelectric converting section, is often employed, to perform imaging of color images.

Japanese Unexamined Patent Publication No. 2009-089082 proposes to generate a reconstruction filter for data of each of R, Gr, Gb, and B channels, and employing the generated reconstruction filters to independently perform reconstruction processes for each channel, in the case that such a color imaging element is employed.

In the method described in Japanese Unexamined Patent Publication No. 2009-089082, convolution calculating processes, which have extremely high calculation costs, are administered for all pixels. Therefore, a problem is recognized that the calculation cost is high.

SUMMARY OF THE INVENTION

The present invention has been developed in view of the foregoing circumstances. It is an object of the present invention to sufficiently reduce calculation costs (calculation time/ amount of memory) when obtaining color images employing a color imaging element in an imaging device that enables obtainment of images in a focused state regardless of distances to subjects.

An imaging device of the present invention comprises:

a lens optical system, for focusing light from a subject;

color imaging means, constituted by a plurality of types of regularly arranged fine light receiving sections that detect light of different wavelength bands, for imaging an image of the subject focused by the lens optical system; and an image processing section, for performing a filtering process in which data output by the imaging means is passed through an image reconstructing filter having properties inverse the blur properties of the lens optical system;

the arrangement pitch of specified light receiving sections that contribute most to the generation of brightness signals from among the plurality of types of light receiving sections being set to be smaller than the arrangement pitches of other light receiving sections;

the lens optical system being of a configuration that expands focal depth by stabilizing spatial frequency properties in the direction of the optical axis, the diameter of the point spread on the light receiving sections being greater than the arrangement pitch of the specified light receiving sections for wavelength bands to be detected by the specified light receiving sections, and less than the arrangement pitches of the other light receiving sections for wavelength bands to be detected by the other light receiving sections; and the image processing section being configured to perform the filtering process only with respect to data output by the specified light receiving sections.

In an imaging device of the present invention in a more specific aspect, an imaging element having an R, G, B color filter in the Bayer pattern is employed as the imaging means; the lens optical system satisfies the following conditions with respect to point spreads:

$$G min. > \sqrt{2} \cdot (Pb - Ab/2)$$

$$R max. < 2Pb - Ab/2$$

$$B max. < 2Pb - Ab/2$$

wherein

Pb: pitch of the light receiving sections of the Bayer pattern color imaging element (in the horizontal and vertical directions)

Ab: the aperture width of the light receiving sections of the Bayer pattern color imaging element Gmin.: the minimum radius of the point spread in the G wavelength Rmax.: the maximum radius of the point spread in the R wavelength Bmax.: the maximum radius of the point spread in the B wavelength; and the image processing section is configured to combine data obtained from Gr and Gb light receiving sections, which are designated as the specified light receiving sections, to generate a G channel, to perform the filtering process only onto data of the G channel, and thereafter, to perform a synchronizing process with respect to R, G, and B channels.

In recent Bayer pattern color filters, Pb is often approximately 1.4 μm, and Ab is often approximately 1.2 μm. In the case that these are the values of Pb and Ab, Gmin.>1.13 μm, Rmax.<2.2 μm, and Bmax<2.2 μm.

In another imaging device of the present invention according to a more specific aspect, an imaging element having an R, G, B color filter in a honeycomb pattern is employed as the imaging means; the lens optical system satisfies the following conditions with respect to point spreads:

$$G min. > Ph - Ah/2$$

$$R max. < \sqrt{2} \cdot (Ph - Ah/2)$$

$$B max. < \sqrt{2} \cdot (Ph - Ah/2)$$

wherein

Ph: pitch of the light receiving sections of the honeycomb pattern color imaging element (in the horizontal and vertical directions)

Ah: the aperture width of the light receiving sections of the honeycomb pattern color imaging element Gmin.: the minimum radius of the point spread in the G wavelength Rmax.: the maximum radius of the point spread in the R wavelength Bmax.: the maximum radius of the point spread in the B wavelength; and the image processing section is configured to perform the filtering process only onto data obtained from G light receiving sections, which are designated as the specified light receiving sections, and thereafter, to perform a synchronizing process with respect to R, G, and B channels.

In recent honeycomb pattern color filters, Ph is often approximately 2.5 μm, and Ah is often approximately 1.5 μm. In the case that these are the values of Ph and Ah, Gmin.>1.75 μm, Rmax.<2.47 μm, and Bmax<2.47 μm.

In still another imaging device of the present invention according to a more specific aspect, an imaging element having an R, G, B color filter in a clear bid pattern is employed as the imaging means;

the lens optical system satisfies the following conditions with respect to point spreads:

$$Gmin.>(Pc/\sqrt{2})-Ac/2$$

$$Rmax.<2Pc-Ac/2$$

$$Bmax.<2Pc-Ac/2$$

wherein

Pc: pitch of the light receiving sections of the clear bid pattern color imaging element (in the horizontal and vertical directions)

Ac: the aperture width of the light receiving sections of the clear bid pattern color imaging element Gmin.: the minimum radius of the point spread in the G wavelength Rmax.: the maximum radius of the point spread in the R wavelength Bmax.: the maximum radius of the point spread in the B wavelength; and the image processing section is configured to perform the filtering process only onto data obtained from G light receiving sections, which are designated as the specified light receiving sections, and thereafter, to perform a synchronizing process with respect to R, G, and B channels.

In recent clear bid pattern color filters, Pc is often approximately 2.5 μm, and Ac is often approximately 1.5 μm. In the case that these are the values of Pb and Ab, Gmin.>1.02 μm, Rmax.<4.25 μm, and Bmax<4.25 μm.

Note that in the imaging device of the present invention, the imaging means is not limited to the single chip imaging elements having the R, G, B color filters in the patterns described above, but may be a three chip imaging means having an imaging element dedicated to each color.

It is known that the perceived resolution of color images is affected by whether high frequency components having spatial frequencies, which are mainly included in brightness signals, are present. This is due to the visual perception properties of humans. These properties are widely used in color TV broadcasting, color image compression, and the like. In the imaging devices which are capable of obtaining images in a focused state regardless of distances to subjects described above as well, processes for reconstructing blur within brightness signals, that is, processes that increase gain for high frequency components, are particularly effective.

The present invention has been achieved based on the aforementioned knowledge. The property of "intentionally increasing the point spread of lenses to a size that includes a plurality of pixels of an imaging sensor, and increasing the range in which the pint spread is stabilized in the direction of the optical axis" is the essence of the mechanism for obtaining images in a focused state regardless of the distances to subjects. This property is utilized only to a specific color channel that contributes most to construct brightness signals, and the filtering process for resolving blur is only administered onto data from the specific color channel. Administration of the filtering process is eliminated for color channels that contribute little to brightness signals in this manner. Thereby, an advantageous effect, that the calculation processing costs are reduced as a whole, is obtained.

Note that even in the configuration described above, data from color channels that contribute little to brightness signals do not greatly influence perceived resolution of color images, and point spread is suppressed in these color channels such that point images do not impinge on a plurality of light receiving sections. Therefore, the perceived resolution of ultimately obtained color images do not differ much at all from cases in which the filtering process is administered onto data from all color channels.

DESCRIPTION OF THE PREFERRED EMBODIMENTS

Hereinafter, embodiments of the present invention will be described in detail with reference to the attached drawings.

Figure 1:
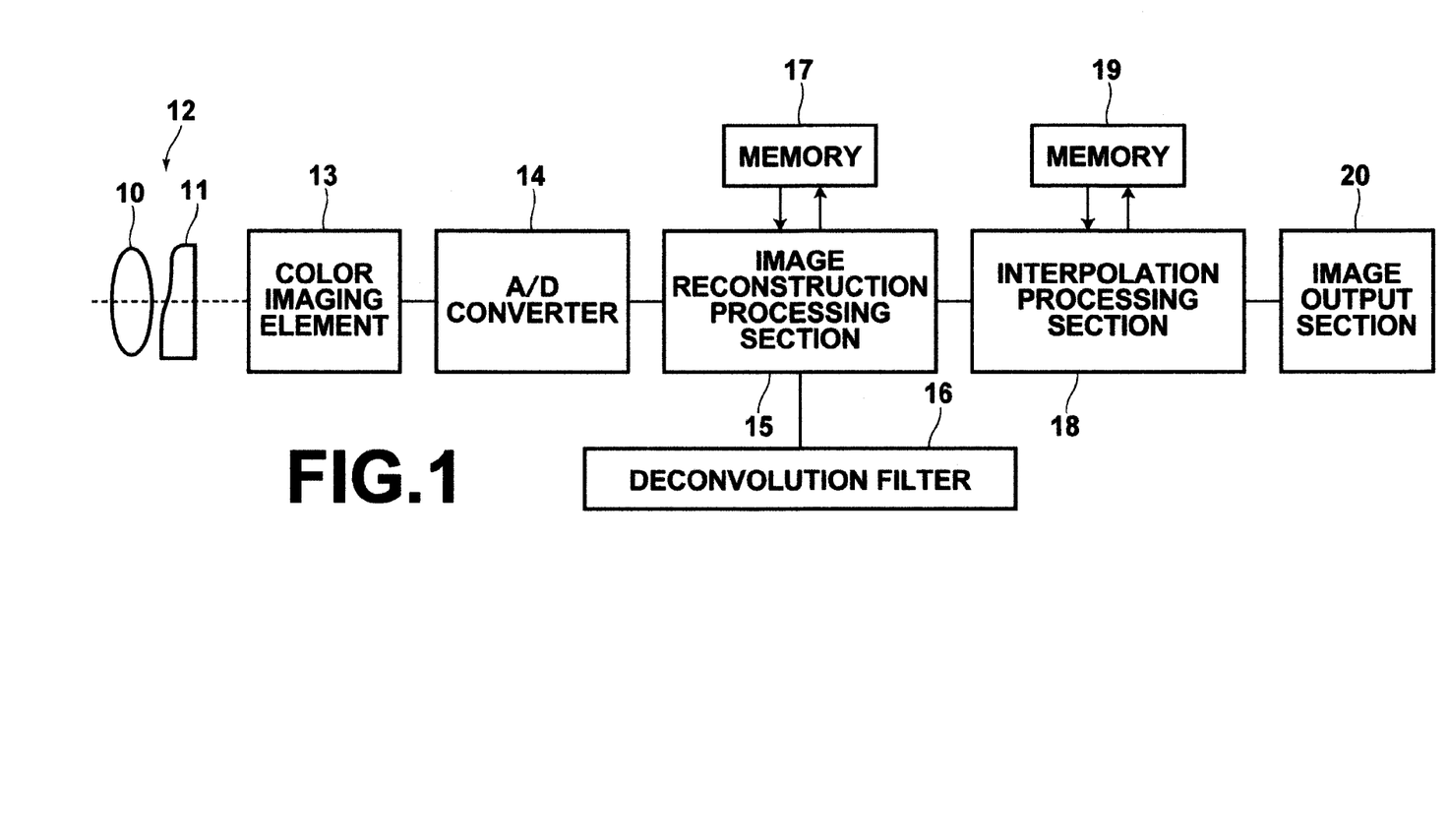
FIG. 1 is a schematic block diagram that illustrates the construction of an imaging device according to an embodiment of the present invention.

FIG. 1 is a schematic block diagram that illustrates the basic construction of a color imaging device according to an embodiment of the present invention. As illustrated in FIG. 1, the imaging device is equipped with: a lens optical system 12 constituted by a lens 10 and a phase plate 11, for example, for focusing light from a subject; a color imaging element 13 constituted by a CCD, for example, for imaging an image of the subject focused by the lens optical system 12; an A/D converter 14 for digitizing analog output from the color imaging element 13; an image reconstruction processing section 15, for administering an image reconstruction process to reduce image blur onto image data output from the A/D converter 14; a deconvolution filter 16 for performing the image reconstruction process; a memory 17 connected to the image reconstruction processing section 15 as a workspace; an interpolation processing section 18, for administering an interpolation process with respect to data output from the image reconstruction processing section 15; a memory 19 connected to the interpolation processing section 18 as a workspace; and an image output section 20, for outputting images based on R, G, and B image data output from the interpolation processing section 18.

Note that in the present embodiment, the aforementioned elements 15 through 19 are constituted by known computer systems. The elements 15 through 19 constitute an image processing section of the present invention. The image output section 20 may be a recording device that records images onto recording media, or display means that displays images employing a CRT, a liquid crystal display panel, etc.

Figure 2:
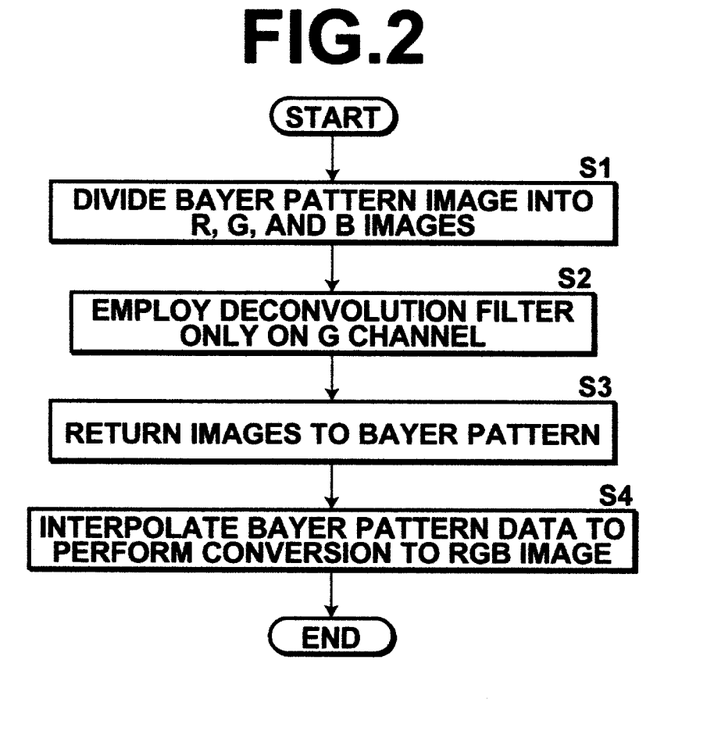
FIG. 2 is a flow chart that illustrates the steps of image processes performed by the imaging device of FIG. 1.
Figure 3:
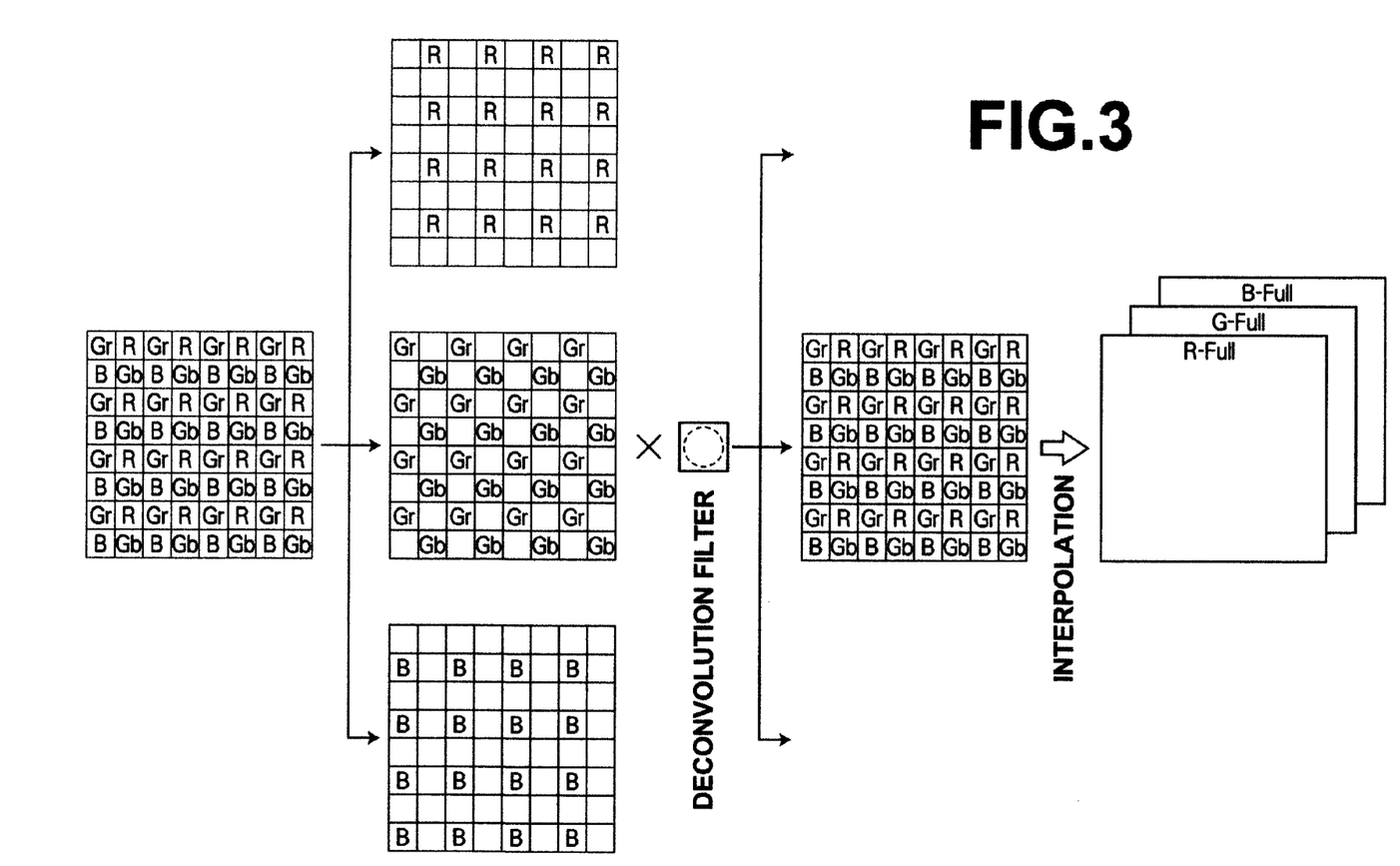
FIG. 3 is a schematic diagram that schematically illustrates the concept of the image process outlined in FIG. 2.

Hereinafter, the processes performed by the image reconstruction processing section 15 and the interpolation processing section 18 will be described with reference to FIG. 2, which illustrates the steps of the processes, as well as to FIG. 3, which schematically illustrates the processes. When the process starts, the image reconstruction processing section 15 first separates the digital color image data output from the A/D converter into three images, for each of an R, a G, and a B channel (step S1 of FIG. 2). This is illustrated in columns 1 and 2 (counted from the left edge) of FIG. 3.

Note that a single chip color imaging element having a color filter in the Bayer pattern is employed as the color imaging element 13. The images borne by the image data, which are the analog signals output from the color imaging element 13 and digitized by the A/D converter 14, are Bayer pattern images, in which R images, G images (more specifically, Gr images which are alternately arranged with R images and constitute a single line, and Gb images which are alternately arranged with B images and constitute a single line), and B images are arranged, as illustrated in FIG. 3.

Next, the image reconstruction processing section 15 administers an image reconstruction filtering process using the deconvolution filter 16 only onto data of the G channel, from among the data obtained for each of the R, G, and B channels (step S2). The deconvolution filter 16 has properties inverse to the blur properties of the lens optical system, that is, the point spread function. By performing the filtering processing using the deconvolution filter 16 having such properties, image data that bear images in a focused state, in which blur has been resolved, are obtained. Note that this type of image reconstruction filter is described in detail in Japanese Unexamined Patent Publication No. 2009-089082 and E. R. Dowski, Jr. and W. T. Cathey, "Extended depth of field through wave-front coding", Appl. Opt., Vol. 34, No. 11, pp. 1859-1866, 1995. Such a known image reconstruction filter may be employed in the present invention.

Next, the image reconstruction processing section 15 performs a process to return the data, which have undergone the filtering process, to the Bayer pattern (step S3). Data which have been returned to the Bayer pattern are illustrated in the third column of FIG. 3. The data, which have been returned to the Bayer pattern, are sent to the interpolation processing section 18 of FIG. 1. The interpolation processing section 18 administers an interpolation process onto the data in the Bayer pattern (step S4). This process is generally referred to as a synchronizing process, and is a process that interpolates spatial shifts among color signals that occur due to color filter arrangement, to calculate color data for each point. Thereby, a three color image signal that represents data for each of three colors R, G, and B is obtained, as illustrated in the fourth column of FIG. 3.

Figure 4:
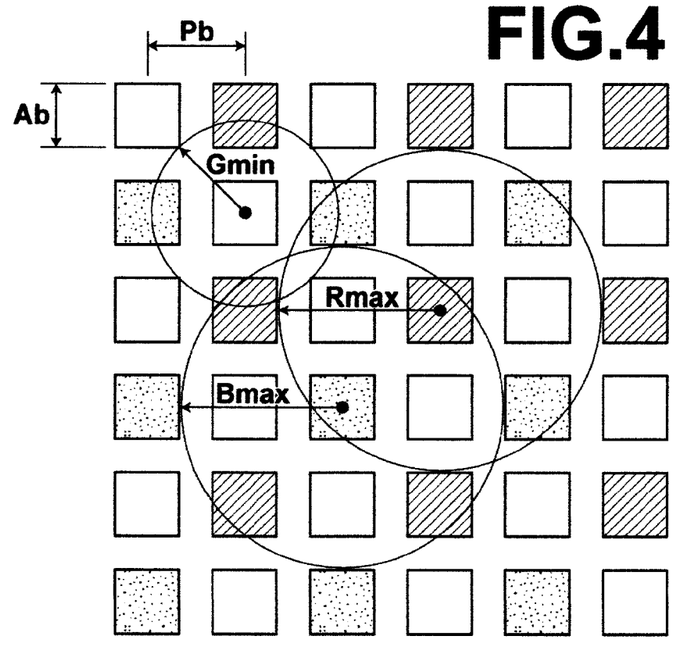
FIG. 4 is a diagram that illustrates the relationships among light receiving sections and point spread in the imaging device of FIG. 1.

The three color image signal is sent to the image output section 20 of FIG. 1. A color image in which blur has been resolved can be obtained, by outputting an image based on the signal. Hereinafter, this point will be described in greater detail. FIG. 4 is a diagram that schematically illustrates the relationships among light receiving sections of the color imaging element 13 and point spread of the lens optical system 12. Note that here, R light receiving sections at which the R filters are arranged are denoted by the hatched squares, G light receiving sections (both Gr and Gb) at which the G filters are arranged are denoted by the white squares, and B light receiving sections at which the B filters are arranged are denoted by the dotted squares.

The lens optical system 12 is that of which the point spreads satisfy the following conditions:

$$G\text{min.} > \sqrt{2} \cdot (Pb - Ab/2)$$

$$R\text{max.} < 2Pb - Ab/2$$

$$B\text{max.} < 2Pb - Ab/2$$

wherein

Pb: pitch of the light receiving sections of the Bayer pattern color imaging element (in the horizontal and vertical directions);

Ab: the aperture width of the light receiving sections of the Bayer pattern color imaging element;

Gmin.: the minimum radius of the point spread in the G wavelength;

Rmax.: the maximum radius of the point spread in the R wavelength; and

Bmax.: the maximum radius of the point spread in the B wavelength.

That is, the point spread of the lens optical system 12 is of a size between the large diameter circle and the small diameter circle illustrated in FIG. 4. As described previously, in the case that Pb=1.4 μm and Ab=1.2 μm, Gmin.>1.13 μm, Rmax.<2.2 μm, and Bmax<2.2 μm.

By employing the lens optical system 12 having the properties as described above, the point spread expands across a plurality of light receiving sections for the G light receiving sections, which particularly contribute to the generation of brightness signals. The image reconstruction filtering process is administered onto data from the G light receiving sections, that is, data of the G channel. Thereby, image data that represent images in which blur has been resolved, and which are in a focused state regardless of distances to subjects, are obtained.

In contrast, as can be understood from FIG. 4, the point spread does not expand across a plurality of light receiving sections for the R light receiving sections and the B light receiving sections, which contribute little to the generation of brightness signals. In addition, data from the R and B channels that contribute little to brightness signals do not greatly influence perceived resolution of color images. Therefore, blur does not particularly stand out in ultimately obtained color images compared to cases in which the filtering process is administered onto data from all color channels, even if the image reconstruction filtering process is not administered onto data from the R and B channels. By omitting administration of the filtering process for data of the R and B channels, the calculation processing costs are reduced as a whole.

The embodiment described above employs the single chip color imaging element 13 equipped with the Bayer pattern color filter. The present invention may be applied to imaging means equipped with color filters of other arrangements as well. Hereinafter, a case in which a color imaging element equipped with R, G, and B color filters in a honeycomb pattern is employed will be described with reference to FIG. 5.

Figure 5:
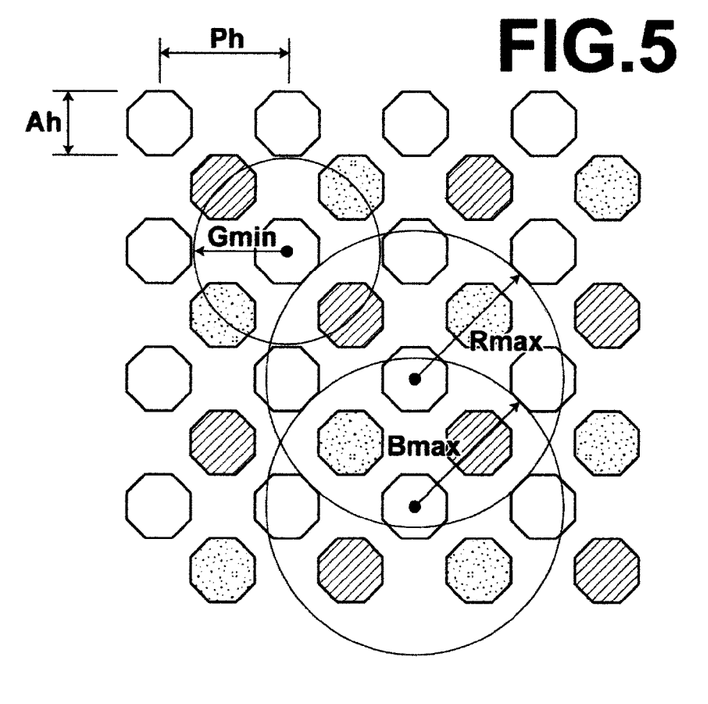
FIG. 5 is a diagram that illustrates the relationships among light receiving sections and point spread in an imaging device according to a second embodiment of the present invention.

FIG. 5 is a diagram that schematically illustrates the relationships among light receiving sections of the color imaging element having R, G, and B filters in a honeycomb pattern and point spread of a lens optical system. Note that here, R light receiving sections at which the R filters are arranged are denoted by the hatched octagons, G light receiving sections (both Gr and Gb) at which the G filters are arranged are denoted by the white octagons, and B light receiving sections at which the B filters are arranged are denoted by the dotted octagons.

Here, the lens optical system satisfies the following conditions with respect to point spreads:

$$Gmin. > Ph-Ah/2$$

$$Rmax. < \sqrt{2} \cdot (Ph-Ah/2)$$

$$Bmax. < \sqrt{2} \cdot (Ph-Ah/2)$$

wherein

Ph: pitch of the light receiving sections of the honeycomb pattern color imaging element (in the horizontal and vertical directions);

Ah: the aperture width of the light receiving sections of the honeycomb pattern color imaging element;

Gmin.: the minimum radius of the point spread in the G wavelength;

Rmax.: the maximum radius of the point spread in the R wavelength; and

Bmax.: the maximum radius of the point spread in the B wavelength.

That is, the point spread in this case is of a size between the large diameter circle and the small diameter circle illustrated in FIG. 5. As described previously, in the case that Ph=2.5 μm and Ah=1.5 μm, Gmin.>1.75 μm, Rmax.<2.47 μm, and Bmax<2.47 μm.

By employing the lens optical system having the properties as described above, the point spread expands across a plurality of light receiving sections for the G light receiving sections, which particularly contribute to the generation of brightness signals in this case as well. The image reconstruction filtering process is administered onto data from the G light receiving sections, that is, data of the G channel. Thereby, image data that represent images in which blur has been resolved, and which are in a focused state regardless of distances to subjects, are obtained.

In contrast, as can be understood from FIG. 5, the point spread does not expand across a plurality of light receiving sections for the R light receiving sections and the B light receiving sections, which contribute little to the generation of brightness signals. In addition, data from the R and B channels that contribute little to brightness signals do not greatly influence perceived resolution of color images, as described previously. Therefore, in this case as well, blur does not particularly stand out in ultimately obtained color images compared to cases in which the filtering process is administered onto data from all color channels, even if the image reconstruction filtering process is not administered onto data from the R and B channels. By omitting administration of the filtering process for data of the R and B channels, the calculation processing costs are reduced as a whole.

Figure 6:
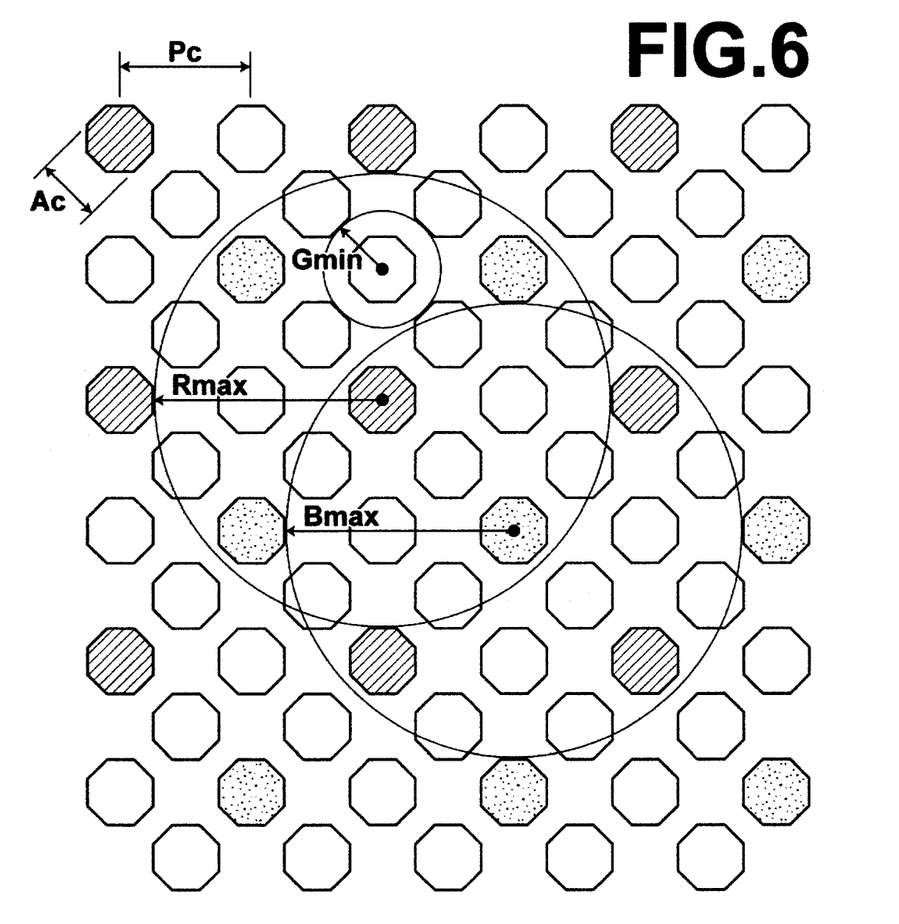
FIG. 6 is a diagram that illustrates the relationships among light receiving sections and point spread in an imaging device according to a third embodiment of the present invention.

Next, a case in which a color imaging element equipped with R, G, and B color filters in a clear bid pattern is employed will be described with reference to FIG. 6. FIG. 6 is a diagram that schematically illustrates the relationships among light receiving sections of the color imaging element having R, G, and B filters in a clear bid pattern and point spread of a lens optical system. Note that here, R light receiving sections at which the R filters are arranged are denoted by the hatched octagons, G light receiving sections (both Gr and Gb) at which the G filters are arranged are denoted by the white octagons, and B light receiving sections at which the B filters are arranged are denoted by the dotted octagons.

Here, the lens optical system satisfies the following conditions with respect to point spreads:

$$Gmin. > (Pc/\sqrt{2}) - Ac/2$$

$$Rmax. < 2Pc - Ac/2$$

$$Bmax. < 2Pc - Ac/2$$

wherein

Pc: pitch of the light receiving sections of the clear bid pattern color imaging element (in the horizontal and vertical directions);

Ac: the aperture width of the light receiving sections of the clear bid pattern color imaging element;

Gmin.: the minimum radius of the point spread in the G wavelength;

Rmax.: the maximum radius of the point spread in the R wavelength; and

Bmax.: the maximum radius of the point spread in the B wavelength.

That is, the point spread in this case is of a size between the large diameter circle and the small diameter circle illustrated in FIG. 6. As described previously, in the case that Pc=2.5 μm and Ac=1.5 μm, Gmin.>Rmax.<4.25 μm, and Bmax<4.25 μm.

By employing the lens optical system having the properties as described above, the point spread expands across a plurality of light receiving sections for the G light receiving sections, which particularly contribute to the generation of brightness signals in this case as well. The image reconstruction filtering process is administered onto data from the G light receiving sections, that is, data of the G channel. Thereby, image data that represent images in which blur has been resolved, and which are in a focused state regardless of distances to subjects, are obtained.

In contrast, as can be understood from FIG. 6, the point spread does not expand across a plurality of light receiving sections for the R light receiving sections and the B light receiving sections, which contribute little to the generation of brightness signals. In addition, data from the R and B channels that contribute little to brightness signals do not greatly influence perceived resolution of color images, as described previously. Therefore, in this case as well, blur does not particularly stand out in ultimately obtained color images compared to cases in which the filtering process is administered onto data from all color channels, even if the image reconstruction filtering process is not administered onto data from the R and B channels. By omitting administration of the filtering process for data of the R and B channels, the calculation processing costs are reduced as a whole.

What is claimed is:

1. An imaging device, comprising:
   a lens optical system, for focusing light from a subject;
   color imaging means, constituted by a plurality of types of regularly arranged fine light receiving sections that detect light of different wavelength bands, for imaging an image of the subject focused by the lens optical system; and
   an image processing section, for performing a filtering process in which data output by the imaging means is passed through an image reconstructing filter having properties inverse the blur properties of the lens optical system;
   the arrangement pitch of specified light receiving sections that contribute most to the generation of brightness signals from among the plurality of types of light receiving sections being set to be smaller than the arrangement pitches of other light receiving sections;
   the lens optical system being of a configuration that expands focal depth by stabilizing spatial frequency properties in the direction of the optical axis, the diameter of the point spread on the light receiving sections being greater than the arrangement pitch of the specified light receiving sections for wavelength bands to be detected by the specified light receiving sections, and less than the arrangement pitches of the other light receiving sections for wavelength bands to be detected by the other light receiving sections; and the image processing section being configured to perform the filtering process only with respect to data output by the specified receiving sections.

2. An imaging device as defined in claim 1, wherein:

an imaging element having an R, G, B color filter in the Bayer pattern is employed as the imaging means;

the lens optical system satisfies the following conditions with respect to point spreads:

$$G\text{min.} > \sqrt{2} \cdot (Pb - Ab/2)$$

$$R\text{max.} < 2Pb - Ab/2$$

$$B\text{max.} < 2Pb - Ab/2$$

wherein

Pb: pitch of the light receiving sections of the Bayer pattern color imaging element (in the horizontal and vertical directions)

Ab: the aperture width of the light receiving sections of the Bayer pattern color imaging element Gmin.: the minimum radius of the point spread in the G wavelength Rmax.: the maximum radius of the point spread in the R wavelength Bmax.: the maximum radius of the point spread in the B wavelength; and the image processing section is configured to combine data obtained from Gr and Gb light receiving sections, which are designated as the specified light receiving sections, to generate a G channel, to perform the filtering process only onto data of the G channel, and thereafter, to perform a synchronizing process with respect to R, G, and B channels.

3. An imaging device as defined in claim 1, wherein:

an imaging element having an R, G, B color filter in a honeycomb pattern is employed as the imaging means;

the lens optical system satisfies the following conditions with respect to point spreads:

$$G\text{min.} > Ph - Ah/2$$

$$R\text{max.} < \sqrt{2} \cdot (Ph - Ah/2)$$

$$B\text{max.} < \sqrt{2} \cdot (Ph - Ah/2)$$

wherein

Ph: pitch of the light receiving sections of the honeycomb pattern color imaging element (in the horizontal and vertical directions)

Ah: the aperture width of the light receiving sections of the honeycomb pattern color imaging element Gmin.: the minimum radius of the point spread in the G wavelength Rmax.: the maximum radius of the point spread in the R wavelength Bmax.: the maximum radius of the point spread in the B wavelength; and the image processing section is configured to perform the filtering process only onto data obtained from G light receiving sections, which are designated as the specified light receiving sections, and thereafter, to perform a synchronizing process with respect to R, G, and B channels.

4. An imaging device as defined in claim 1, wherein:

an imaging element having an R, G, B color filter in a clear bid pattern is employed as the imaging means;

the lens optical system satisfies the following conditions with respect to point spreads:

$$G\text{min.} > (Pc\sqrt{2}) - Ac/2$$

$$R\text{max.} < 2Pc - Ac/2$$

$$B\text{max.} < 2Pc - Ac/2$$

wherein

Pc: pitch of the light receiving sections of the clear bid pattern color imaging element (in the horizontal and vertical directions)

Ac: the aperture width of the light receiving sections of the clear bid pattern color imaging element Gmin.: the minimum radius of the point spread in the G wavelength Rmax.: the maximum radius of the point spread in the R wavelength Bmax.: the maximum radius of the point spread in the B wavelength; and the image processing section is configured to perform the filtering process only onto data obtained from G light receiving sections, which are designated as the specified light receiving sections, and thereafter, to perform a synchronizing process with respect to R, G, and B channels.

\* \* \* \* \*